United States Patent Office 2,708,422
Patented May 17, 1955

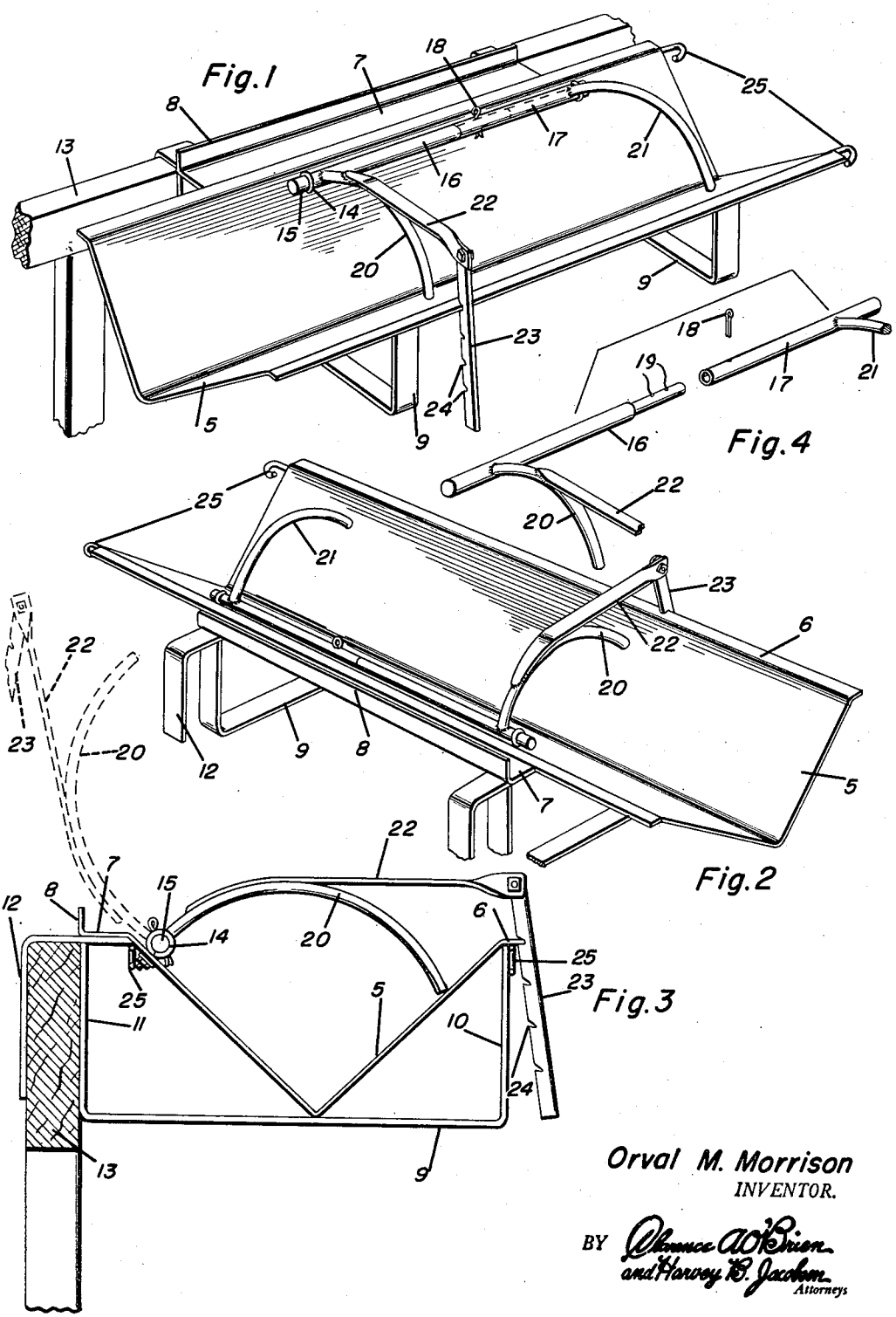

2,708,422

ANIMAL OPERATING TABLE

Orval M. Morrison, Mount Union, Iowa

Application December 8, 1953, Serial No. 396,869

5 Claims. (Cl. 119—103)

The present invention relates to new and useful improvements in animal operating tables for use in supporting and restraining an animal on its back while operating, vaccinating or otherwise treating the animal.

An important object of the invention is to provide a portable animal operating table equipped with hanger hooks for supporting the table on a fence or other suitable structure.

Another object is to provide a trough-like table having vertically swingable animal clamping arms holding the animal in the trough by adjustable catch means.

A further object is to provide a device of this character of simple and practical construction, which is strong and durable, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front perspective view;

Figure 2 is a rear perspective view;

Figure 3 is an enlarged end elevational view; and

Figure 4 is a group perspective view of the swingable clamping member.

Referring now to the drawing in detail, wherein for the purpose of illustration I have disclosed a preferred embodiment of my invention, the numeral 5 designates a trough-like table preferably of sheet metal and having a forwardly projecting flange 6 at its front edge and a rearwardly projecting shelf 7 at its rear edge and formed with an upstanding flange or shield 8.

A pair of U-shaped strap metal braces 9 underlie and support the table with the bottom of the table resting on the braces and with the front and rear legs 10 and 11 respectively of the braces fixed to and supporting the front flange 6 and rear shelf 7.

Hanger hooks 12 also of strap metal extend downwardly from the rear shelf 7 in rearwardly spaced relation with respect to the rear legs 11 of the braces and are adapted to support the table on the upper rail 13 of a fence or similar supporting structure.

A pair of eye bolts 14 are secured to the rear portion of the table and in which an extensibly adjustable rod 15 is rotatably supported. Rod 15 is composed of a pair of telescoping sections 16 and 17 secured to each other for rotation as a unit and in longitudinally adjusted position by a pin 18 selectively engaged in a row of openings 19 in the telescoping ends of the sections of the rod.

A pair of arcuate arms 20 and 21 are welded to the respective sections of the rod in a forwardly extending direction to overlie and clamp an animal (not shown) in the trough of the table. An extension arm 22 projects forwardly from arm 20 and to the front end of which a vertical latch bar 23 is pivoted at its upper end to extend downwardly in front of the table. Notches 24 are formed in latch bar 23 adapted to selectively engage the front flange 6 to lock the clamping arms in adjusted position according to the size of the animal placed on the table.

In the operation of the device, the clamping arms 20 and 21 are raised to the dotted line position shown in Figure 3, and the animal is then placed in the trough of the table and the arms lowered and locked by the latch bar 23 to tightly hold the animal on the table.

The arms 20 and 21 may be adjusted longitudinally of the table by adjusting the telescoping sections 16 and 17 of rod 15 to accommodate animals of different sizes.

A pair of hooks 25 are also provided at one end of the table for engaging a supporting structure (not shown), after first detaching the hooks 12 from the supporting structure 13, while the other end of the table rests on the ground to support the table in an inclined position, when it is desired to lower the animal's head in certain types of operative procedure.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An animal operating table comprising a trough adapted for placing an animal therein, a rod composed of a pair of extensibly adjusted sections each having an arm fixed thereto, means rotatably attaching the rod to the trough for swinging the arms vertically into and out of a transversely overlying position in the trough, means locking the sections of the rod to each other in extensibly adjusted position and for unitary rotary movement, and latch means locking the arms to the trough in animal clamping position.

2. The combination of claim 1 wherein said trough includes hanger hooks at its rear edge for supporting the trough on a supporting structure.

3. The combination of claim 1 wherein said trough includes hooks at one end for supporting said end of the trough in an inclined position on a supporting structure while the other end of the trough rests on the ground.

4. The combination of claim 1 wherein said trough includes a U-shaped brace transversely underlying the trough and supporting the front, rear and center portions of the trough.

5. The combination of claim 1 wherein said trough is of sheet metal construction and includes a shelf at its rear edge having an upstanding shield.

References Cited in the file of this patent

UNITED STATES PATENTS

| | | |
|---|---|---|
| 644,313 | Anderson | Feb. 27, 1900 |
| 1,055,953 | Tanabe | Mar. 11, 1913 |
| 1,218,381 | Dragoo | Mar. 6, 1917 |
| 1,334,256 | Morgan | Mar. 16, 1920 |
| 1,469,496 | Christopher | Oct. 2, 1923 |
| 1,705,115 | Hollestelle | Mar. 12, 1929 |
| 1,746,115 | Hermanni | Feb. 4, 1930 |
| 1,842,015 | Finson | Jan. 19, 1932 |
| 2,631,568 | Beach | Mar. 17, 1953 |

FOREIGN PATENTS

| | | |
|---|---|---|
| 896,128 | France | Apr. 17, 1944 |